UNITED STATES PATENT OFFICE.

OTTO MANKIEWICZ AND JULIUS ALTSCHUL, OF BERLIN, AND WILHELM URBAN, OF WILMERSDORF, NEAR BERLIN, GERMANY, ASSIGNORS TO ACTIEN GESELLSCHAFT FÜR ANILIN FABRIKATION, OF WILMERSDORF, NEAR BERLIN, GERMANY.

BORATE OF HEXAMETHYLENEAMIN AND PROCESS OF MAKING SAME.

No. 869,636.  Specification of Letters Patent.  Patented Oct. 29, 1907.

Application filed August 11, 1906. Serial No. 330,266.

*To all whom it may concern:*

Be it known that we, OTTO MANKIEWICZ, JULIUS ALTSCHUL, and WILHELM URBAN, the former two of Berlin, the latter of Wilmersdorf, near Berlin, in the Kingdom of Prussia, German Empire, have invented new and useful Improvements in New Borates of Hexamethyleneamin and Processes of Making the Same; and we do hereby declare that the following is a full, clear, and exact description thereof, which will enable others skilled in the art to which it appertains to make and use the same.

Little has been known hitherto about the salts of boric acid with organic bases; no borates have yet been described of methylamin, dimethylamin or trimethylamin and there is only known a tetraborate of anilin (compare Ditte, *Jahresberichte über die Fortschritte der Chemie*, 1887, page 886). Ammonia itself yields no normal borates but only compounds with very small percentage of the base (compare Graham Otto, *Anorganische Chemie*, Braunschweig 1884, V. Aufl., III. Abteilung, page 497).

We have now found that new valuable borates can be obtained by the action of boric acid on hexamethyleneamin. The combination of the two compounds can be performed by thoroughly mixing the same or by causing them to react in an aqueous or alcoholic solution. The composition of the borates obtained varies according to the proportion of the components; for every molecule of boric acid which combines with one molecule of hexamethyleneamin one molecule of water is split off. It appears therefore that the new borates of hexamethyleneamin are derivatives of meta-boric acid as their composition corresponds to the general formula: $(CH_2)_6N_4.(HBO_2)_n$. In the manner described one to four molecules of boric acid can be combined with one molecule of hexamethyleneamin.

The following examples may serve to illustrate our invention; the parts being by weight:

Example 1: 62 parts of boric acid and 140 parts of hexamethyleneamin are very thoroughly mixed by grinding them together. The mass soon becomes crumbling on account of the formation of water by the combination of the ingredients. It is then reduced to dryness by heating it at about 60 to 70° centigrade. The product thus obtained contains about 33 per cent. of boric acid (calculated as $H_3BO_3$) and about 30 per cent. of nitrogen. It appears therefore that the product has the composition corresponding to the formula:

$$(CH_2)_6N_4.HBO_2,$$

the reaction being illustrated by the following equation:

$$H_3BO_3+(CH_2)_6N_4=(CH_2)_6N_4.(HBO_2)+H_2O$$

Example 2: If 124 parts of boric acid and 140 parts of hexamethyleneamin are treated as described in example 1, the reaction product after being dried contains about 54 % of boric acid and 61 per cent. of hexamethyleneamin corresponding to the formula:

$$(CH_2)_6N_4.(HBO_2)_2,$$

this reaction being illustrated by the following equation:

$$2H_3BO_3+(CH_2)_6N_4=(CH_2)_6N_4.(HBO_2)_2+2H_2O.$$

Example 3: When combining in 186 parts of boric acid and 140 parts of hexamethyleneamin in the manner described in Example 1, a product is obtained which contains about 68 per cent. of boric acid and 51 per cent. of hexamethyleneamin (the percentage of boric acid being calculated on $H_3BO_3$). This product corresponds to the formula: $(CH_2)_6N_4.(HBO_2)_3$.

Example 4: By using in the process described in Example 1, 248 parts of boric acid and 140 parts of hexamethyleneamin there is obtained a hexamethyleneaminborate, the composition of which corresponds to the formula: $(CH_2)_6N_4.(HBO_2)_4$.

Example 5: 13 parts of boric acid are dissolved in 160 parts of hot alcohol of 96 volume per cent. strength and to this solution are added 28 parts of hexamethyleneamin. The latter having dissolved the liquid is filtered and allowed to cool. The reaction product then separates in the shape of colorless crystals which after drying possess the composition corresponding to the formula: $(CH_2)_6N_4.(HBO_2)_2$.

Example 6: 62 parts of boric acid in 140 parts of hexamethyleneamin are dissolved together in 300 parts of water and the solution is filtered. When this solution is evaporated to about half its weight prismatic crystals are separated which in the dry state correspond to the formula: $(CH_2)_6N_4.(HBO_2)_3$.

The new borates of hexamethyleneamin obtained according to our invention as set forth, are colorless or white substances of weakly acid reaction, readily soluble in water, sparingly soluble in alcohol, insoluble in ether. They decompose without melting on being heated in the dry state giving off alkaline vapors, the smell of which resembles that of methyl-amin. When heated with diluted sulfuric acid the new borates split off formic aldehyde, the resulting solution developing ammonia on boiling with an excess of soda-lye. When the new borates are mixed with alcohol and the alcohol is lighted, the flame remains uncolored at first and only after some time when decomposition sets in the green boric acid flame is produced, which, however, is at once obtained on addition of sulfuric acid to the above mixture.

The new borates of hexamethylamin are valuable internal remedies as they are free from the irritating effects often observed when using hexamethyleneamin itself.

Having now described our invention and the manner in which the same is to be performed what we claim is,—

1. The process for the production of new borates of hexamethyleneamin which consists in reacting on hexamethyleneamin with boric acid.

2. As a new article of manufacture the new borates of hexamethyleneamin which can be obtained by the action of boric acid on hexamethyleneamin as above set forth, being colorless or white substances of weakly acid reaction, easily soluble in water, sparingly soluble in alcohol, insoluble in ether, which decompose without melting when heated in the dry state, which on heating with dilute sulfuric acid split off formic aldehyde, the resulting solution developing ammonia when boiled with an excess of soda lye, which borates when mixed with alcohol and the alcohol being lighted, leave the flame at first uncolored, whereas on addition of sulfuric acid to the mixture they yield at once the green boric acid flame.

3. As a new article of manufacture the new borate of hexamethyleneamin which may be obtained by thoroughly mixing one molecular quantity of hexamethyleneamin with three molecular quantities of boric acid and drying the mixture at 60–70°, being a colorless or white substance of weakly acid reaction, easily soluble in water, sparingly soluble in alcohol, insoluble in ether, which decomposes without melting when heated in the dry state, which on heating with diluted sulfuric acid splits off formic aldehyde, the resulting solution developing ammonia when boiled with an excess of soda-lye, which borate when mixed with alcohol and the alcohol being lighted, leaves the flame at first uncolored, whereas on addition of sulfuric acid to the mixture it yields at once the green boric acid flame and which borate contains about 68 per cent. of boric acid (calculated as $H_3BO_3$) and 51 per cent. of hexamethyleneamin corresponding to the formula: $(CH_2)_6N_4.(HBO_2)_3$.

In witness whereof we have hereunto signed our names this 27 day of July 1906, in the presence of two subscribing witnesses.

OTTO MANKIEWICZ.
JULIUS ALTSCHUL.
WILHELM URBAN.

Witnesses:
HENRY HASPER,
WILLIAM MAYNER.